(12) United States Patent
Shpigelman et al.

(10) Patent No.: US 11,005,724 B1
(45) Date of Patent: May 11, 2021

(54) NETWORK TOPOLOGY HAVING MINIMAL NUMBER OF LONG CONNECTIONS AMONG GROUPS OF NETWORK ELEMENTS

(71) Applicant: Mellanox Technologies, Ltd., Yokneam (IL)

(72) Inventors: Yuval Shpigelman, Netanya (IL); Eitan Zahavi, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 106 days.

(21) Appl. No.: 16/240,749

(22) Filed: Jan. 6, 2019

(51) Int. Cl.
*H04L 12/24* (2006.01)
*H04L 12/46* (2006.01)

(52) U.S. Cl.
CPC ............ *H04L 41/145* (2013.01); *H04L 12/46* (2013.01)

(58) Field of Classification Search
CPC . H04L 41/12; H04L 41/0893; H04L 41/0803; H04L 12/462; H04L 12/4633; H04L 41/08; H04L 41/0816; H04L 41/0826; H04L 41/142; H04L 43/0876; H04L 45/16; H04L 45/22; H04L 5/0058; H04B 10/1149; H04B 10/25753; G06F 2009/45595; H04W 16/10; H04W 24/02; H04W 84/18
See application file for complete search history.

(56) References Cited

U.S. PATENT DOCUMENTS

| | | |
|---|---|---|
| 4,312,064 A | 1/1982 | Bench et al. |
| 6,115,385 A | 9/2000 | Vig |
| 6,169,741 B1 | 1/2001 | Lemaire et al. |
| 6,480,500 B1 | 11/2002 | Erimli et al. |
| 6,532,211 B1 | 3/2003 | Rathonyi et al. |
| 6,553,028 B1 | 4/2003 | Tang et al. |
| 6,614,758 B2 | 9/2003 | Wong |

(Continued)

FOREIGN PATENT DOCUMENTS

WO 2016105446 A1 6/2016

OTHER PUBLICATIONS

U.S. Appl. No. 15/050,480 office action dated Apr. 9, 2020.

(Continued)

*Primary Examiner* — Yemane Mesfin
*Assistant Examiner* — Mon Cheri S Davenport
(74) *Attorney, Agent, or Firm* — Kligler & Associates Patent Attorneys Ltd (57) ABSTRACT

A design tool for network interconnection includes a processor coupled to an input device and to an output device. The processor receives via the input device design parameters including: (i) a number G of groups of network elements, (ii) a number S of spines associated with each group, and (iii) a number P of ports that each spine has for connecting to other spines, using short-cable connections or long-cable connections. The processor determines an interconnection plan by specifying connections among spines belonging to different groups, in a clique or a bipartite scheme, so that for given values of G, S and P, (i) a number of the long-cable connections among the spines is minimized, and (ii) a number of inter-group connections is balanced among the G groups up to a deviation of a single connection. The processor outputs to the output device instructions for applying the interconnection plan.

20 Claims, 5 Drawing Sheets

(56) References Cited

U.S. PATENT DOCUMENTS

| | | |
|---|---|---|
| 6,665,297 B1 | 12/2003 | Hariguchi et al. |
| 6,775,268 B1 | 8/2004 | Wang et al. |
| 6,795,886 B1 | 9/2004 | Nguyen |
| 6,804,532 B1 | 10/2004 | Moon et al. |
| 6,807,175 B1 | 10/2004 | Jennings et al. |
| 6,831,918 B1 | 12/2004 | Kavak |
| 6,912,589 B1 | 6/2005 | Jain et al. |
| 6,912,604 B1 | 6/2005 | Tzeng et al. |
| 6,950,428 B1 | 9/2005 | Horst et al. |
| 7,010,607 B1 | 3/2006 | Bunton |
| 7,076,569 B1 | 7/2006 | Bailey et al. |
| 7,221,676 B2 | 5/2007 | Green et al. |
| 7,234,001 B2 | 6/2007 | Simpson et al. |
| 7,274,869 B1 | 9/2007 | Pan et al. |
| 7,286,535 B2 | 10/2007 | Ishikawa et al. |
| 7,401,157 B2 | 7/2008 | Costantino et al. |
| 7,676,597 B2 | 3/2010 | Kagan et al. |
| 7,746,854 B2 | 6/2010 | Ambe et al. |
| 7,899,930 B1 | 3/2011 | Turner et al. |
| 7,924,837 B1 | 4/2011 | Shabtay et al. |
| 7,936,770 B1 | 5/2011 | Frattura et al. |
| 7,969,980 B1 | 6/2011 | Florit et al. |
| 8,094,569 B2 | 1/2012 | Gunukula et al. |
| 8,175,094 B2 | 5/2012 | Bauchot et al. |
| 8,195,989 B1 | 6/2012 | Lu et al. |
| 8,213,315 B2 | 7/2012 | Crupnicoff et al. |
| 8,401,012 B2 | 3/2013 | Underwood et al. |
| 8,489,718 B1 | 7/2013 | Brar et al. |
| 8,495,194 B1 | 7/2013 | Brar et al. |
| 8,570,865 B2 * | 10/2013 | Goldenberg ............ H04L 12/12 370/230 |
| 8,576,715 B2 | 11/2013 | Bloch et al. |
| 8,605,575 B2 | 12/2013 | Gunukula et al. |
| 8,621,111 B2 | 12/2013 | Marr et al. |
| 8,625,427 B1 | 1/2014 | Terry et al. |
| 8,681,641 B1 | 3/2014 | Sajassi et al. |
| 8,755,389 B1 | 6/2014 | Poutievski et al. |
| 8,774,063 B2 | 7/2014 | Beecroft |
| 8,867,356 B2 | 10/2014 | Bloch et al. |
| 8,873,567 B1 | 10/2014 | Mandal et al. |
| 8,908,704 B2 | 12/2014 | Koren et al. |
| 9,014,006 B2 | 4/2015 | Haramaty et al. |
| 9,042,234 B1 | 5/2015 | Liljenstolpe et al. |
| 9,231,888 B2 | 1/2016 | Bogdanski et al. |
| 9,385,949 B2 | 7/2016 | Vershkov et al. |
| 9,571,400 B1 | 2/2017 | Mandal et al. |
| 10,200,294 B2 | 2/2019 | Shpiner et al. |
| 2001/0043564 A1 | 11/2001 | Bloch et al. |
| 2001/0043614 A1 | 11/2001 | Viswanadhham et al. |
| 2002/0009073 A1 | 1/2002 | Furukawa et al. |
| 2002/0013844 A1 | 1/2002 | Garrett et al. |
| 2002/0026525 A1 | 2/2002 | Armitage |
| 2002/0039357 A1 | 4/2002 | Lipasti et al. |
| 2002/0071439 A1 | 6/2002 | Reeves et al. |
| 2002/0085586 A1 | 7/2002 | Tzeng |
| 2002/0136163 A1 | 9/2002 | Kawakami et al. |
| 2002/0138645 A1 | 9/2002 | Shinomiya et al. |
| 2002/0141412 A1 | 10/2002 | Wong |
| 2002/0165897 A1 | 11/2002 | Kagan et al. |
| 2002/0176363 A1 | 11/2002 | Durinovic-Johri et al. |
| 2003/0016624 A1 | 1/2003 | Bare |
| 2003/0039260 A1 | 2/2003 | Fujisawa |
| 2003/0065856 A1 | 4/2003 | Kagan et al. |
| 2003/0079005 A1 | 4/2003 | Myers et al. |
| 2003/0097438 A1 | 5/2003 | Bearden et al. |
| 2003/0223453 A1 | 12/2003 | Stoler et al. |
| 2004/0024903 A1 | 2/2004 | Costatino et al. |
| 2004/0062242 A1 | 4/2004 | Wadia et al. |
| 2004/0111651 A1 | 6/2004 | Mukherjee et al. |
| 2004/0202473 A1 | 10/2004 | Nakamura et al. |
| 2005/0013245 A1 | 1/2005 | Sreemanthula et al. |
| 2005/0154790 A1 * | 7/2005 | Nagata ................ H04L 41/145 709/223 |
| 2005/0157641 A1 | 7/2005 | Roy |
| 2005/0259588 A1 | 11/2005 | Preguica |
| 2006/0126627 A1 | 6/2006 | Diouf |
| 2006/0143300 A1 | 6/2006 | See et al. |
| 2006/0182034 A1 | 8/2006 | Klinker et al. |
| 2006/0215645 A1 | 9/2006 | Kangyu |
| 2006/0291480 A1 | 12/2006 | Cho et al. |
| 2007/0030817 A1 | 2/2007 | Arunachalam et al. |
| 2007/0058536 A1 | 3/2007 | Vaananen et al. |
| 2007/0058646 A1 | 3/2007 | Hermoni |
| 2007/0070998 A1 | 3/2007 | Sethuram et al. |
| 2007/0091911 A1 | 4/2007 | Watanabe et al. |
| 2007/0104192 A1 | 5/2007 | Yoon et al. |
| 2007/0183418 A1 | 8/2007 | Riddoch et al. |
| 2007/0223470 A1 | 9/2007 | Stahl |
| 2007/0237083 A9 | 10/2007 | Oh et al. |
| 2008/0002690 A1 | 1/2008 | Ver Steeg et al. |
| 2008/0101378 A1 | 5/2008 | Krueger |
| 2008/0112413 A1 | 5/2008 | Pong |
| 2008/0165797 A1 | 7/2008 | Aceves |
| 2008/0186981 A1 | 8/2008 | Seto et al. |
| 2008/0189432 A1 | 8/2008 | Abali et al. |
| 2008/0267078 A1 | 10/2008 | Farinacci et al. |
| 2008/0298248 A1 | 12/2008 | Roeck et al. |
| 2009/0010159 A1 | 1/2009 | Brownell et al. |
| 2009/0022154 A1 | 1/2009 | Kiribe et al. |
| 2009/0097496 A1 | 4/2009 | Nakamura et al. |
| 2009/0103534 A1 | 4/2009 | Malledant et al. |
| 2009/0119565 A1 | 5/2009 | Park et al. |
| 2009/0262741 A1 | 10/2009 | Jungck et al. |
| 2010/0020796 A1 | 1/2010 | Park et al. |
| 2010/0039959 A1 | 2/2010 | Gilmartin |
| 2010/0049942 A1 | 2/2010 | Kim et al. |
| 2010/0111529 A1 | 5/2010 | Zeng et al. |
| 2010/0141428 A1 | 6/2010 | Mildenberger et al. |
| 2010/0216444 A1 | 8/2010 | Mariniello et al. |
| 2010/0284404 A1 | 11/2010 | Gopinath et al. |
| 2010/0290385 A1 | 11/2010 | Ankaiah et al. |
| 2010/0290458 A1 | 11/2010 | Assarpour et al. |
| 2010/0315958 A1 | 12/2010 | Luo et al. |
| 2011/0019673 A1 | 1/2011 | Fernandez |
| 2011/0080913 A1 | 4/2011 | Liu et al. |
| 2011/0085440 A1 | 4/2011 | Owens et al. |
| 2011/0085449 A1 | 4/2011 | Jeyachandran et al. |
| 2011/0090784 A1 | 4/2011 | Gan |
| 2011/0164496 A1 | 7/2011 | Loh et al. |
| 2011/0164518 A1 | 7/2011 | Daraiseh et al. |
| 2011/0225391 A1 | 9/2011 | Burroughs et al. |
| 2011/0249679 A1 | 10/2011 | Lin et al. |
| 2011/0255410 A1 | 10/2011 | Yamen et al. |
| 2011/0265006 A1 | 10/2011 | Morimura et al. |
| 2011/0299529 A1 | 12/2011 | Olsson et al. |
| 2012/0020207 A1 | 1/2012 | Corti et al. |
| 2012/0075999 A1 | 3/2012 | Ko et al. |
| 2012/0082057 A1 | 4/2012 | Welin et al. |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0163797 A1 | 6/2012 | Wang |
| 2012/0170582 A1 | 7/2012 | Abts et al. |
| 2012/0207175 A1 | 8/2012 | Raman et al. |
| 2012/0287791 A1 | 11/2012 | Xi et al. |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1 | 5/2013 | Wakumoto |
| 2013/0159548 A1 | 6/2013 | Vasseur et al. |
| 2013/0170451 A1 | 7/2013 | Krause et al. |
| 2013/0204933 A1 | 8/2013 | Cardona et al. |
| 2013/0208720 A1 | 8/2013 | Ellis et al. |
| 2013/0242745 A1 | 9/2013 | Umezuki |
| 2013/0259033 A1 | 10/2013 | Hefty |
| 2013/0297757 A1 | 11/2013 | Han et al. |
| 2013/0301646 A1 | 11/2013 | Bogdanski et al. |
| 2013/0315237 A1 | 11/2013 | Kagan et al. |
| 2013/0322256 A1 | 12/2013 | Bader et al. |
| 2013/0329727 A1 | 12/2013 | Rajagopalan et al. |
| 2013/0336116 A1 | 12/2013 | Vasseur et al. |

(56) References Cited

U.S. PATENT DOCUMENTS

| | | |
|---|---|---|
| 2013/0336164 A1 | 12/2013 | Yang et al. |
| 2014/0016457 A1 | 1/2014 | Enyedi et al. |
| 2014/0022942 A1 | 1/2014 | Han et al. |
| 2014/0043959 A1 | 2/2014 | Owens et al. |
| 2014/0059440 A1* | 2/2014 | Sasaki ............... H04L 41/145 715/735 |
| 2014/0105034 A1 | 4/2014 | Sun |
| 2014/0140341 A1 | 5/2014 | Bataineh et al. |
| 2014/0169173 A1 | 6/2014 | Naouri et al. |
| 2014/0192646 A1 | 7/2014 | Mir et al. |
| 2014/0198636 A1 | 7/2014 | Thayalan et al. |
| 2014/0211631 A1 | 7/2014 | Haramaty et al. |
| 2014/0211808 A1 | 7/2014 | Koren et al. |
| 2014/0269305 A1 | 9/2014 | Nguyen |
| 2014/0313880 A1 | 10/2014 | Lu et al. |
| 2014/0328180 A1 | 11/2014 | Kim et al. |
| 2014/0343967 A1 | 11/2014 | Baker |
| 2015/0030033 A1 | 1/2015 | Vasseur et al. |
| 2015/0052252 A1 | 2/2015 | Gilde et al. |
| 2015/0092539 A1 | 4/2015 | Sivabalan et al. |
| 2015/0098466 A1 | 4/2015 | Haramaty et al. |
| 2015/0124815 A1 | 5/2015 | Beliveau et al. |
| 2015/0127797 A1 | 5/2015 | Attar et al. |
| 2015/0131663 A1 | 5/2015 | Brar et al. |
| 2015/0163144 A1 | 6/2015 | Koponen et al. |
| 2015/0172070 A1 | 6/2015 | Csaszar |
| 2015/0194215 A1 | 7/2015 | Douglas et al. |
| 2015/0195204 A1 | 7/2015 | Haramaty et al. |
| 2015/0249590 A1 | 9/2015 | Gusat et al. |
| 2015/0295858 A1 | 10/2015 | Chrysos et al. |
| 2015/0372898 A1 | 12/2015 | Haramaty et al. |
| 2015/0372916 A1 | 12/2015 | Haramaty et al. |
| 2016/0012004 A1 | 1/2016 | Arimilli et al. |
| 2016/0014636 A1 | 1/2016 | Bahr et al. |
| 2016/0028613 A1 | 1/2016 | Haramaty et al. |
| 2016/0043933 A1 | 2/2016 | Gopalarathnam |
| 2016/0080120 A1 | 3/2016 | Unger et al. |
| 2016/0080321 A1 | 3/2016 | Pan et al. |
| 2016/0182378 A1 | 6/2016 | Basavaraja et al. |
| 2016/0294715 A1 | 10/2016 | Raindel et al. |
| 2017/0054445 A1 | 2/2017 | Wang |
| 2017/0054591 A1 | 2/2017 | Hyoudou et al. |
| 2017/0068669 A1 | 3/2017 | Levy et al. |
| 2017/0070474 A1 | 3/2017 | Haramaty et al. |
| 2017/0180243 A1 | 6/2017 | Haramaty et al. |
| 2017/0187614 A1 | 6/2017 | Haramaty et al. |
| 2017/0244630 A1 | 8/2017 | Levy et al. |
| 2017/0270119 A1 | 9/2017 | Kfir et al. |
| 2017/0286292 A1 | 10/2017 | Levy et al. |
| 2017/0331740 A1 | 11/2017 | Levy et al. |
| 2017/0358111 A1* | 12/2017 | Madsen ............... G06T 11/206 |
| 2018/0026878 A1 | 1/2018 | Zahavi et al. |
| 2018/0139132 A1 | 5/2018 | Edsall et al. |
| 2018/0302288 A1 | 10/2018 | Schmatz |
| 2020/0042667 A1* | 2/2020 | Swaminathan ....... G06F 30/392 |

OTHER PUBLICATIONS

Leiserson, C E., "Fat-Trees: Universal Networks for Hardware Efficient Supercomputing", IEEE Transactions on Computers, vol. C-34, No. 10, pp. 892-901, Oct. 1985.

Ohring et al., "On Generalized Fat Trees", Proceedings of the 9th International Symposium on Parallel Processing, pp. 37-44, Santa Barbara, USA, Apr. 25-28, 1995.

Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.

Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.

Matsuoka S., "You Don't Really Need Big Fat Switches Anymore—Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, Jun. 21-25, 2008.

Jiang et al., "Indirect Adaptive Routing on Large Scale Interconnection Networks", 36th International Symposium on Computer Architecture, pp. 220-231, Austin, USA, Jun. 20-24, 2009.

Minkenberg et al., "Adaptive Routing in Data Center Bridges", Proceedings of 17th IEEE Symposium on High Performance Interconnects, New York, USA, pp. 33-41, Aug. 25-27, 2009.

Kim et al., "Adaptive Routing in High-Radix Clos Network", Proceedings of the 2006 ACM/IEEE Conference on Supercomputing (SC2006), Tampa, USA, Nov. 2006.

Infiniband Trade Association, "InfiniBandTM Architecture Specification vol. 1", Release 1.2.1, Nov. 2007.

Culley et al., "Marker PDU Aligned Framing for TCP Specification", IETF Network Working Group, RFC 5044, Oct. 2007.

Shah et al., "Direct Data Placement over Reliable Transports", IETF Network Working Group, RFC 5041, Oct. 2007.

Martinez et al., "Supporting fully adaptive routing in Infiniband networks", Proceedings of the International Parallel and Distributed Processing Symposium (IPDPS'03),Apr. 22-26, 2003.

Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.

Gusat et al., "R3C2: Reactive Route & Rate Control for CEE", Proceedings of 18th IEEE Symposium on High Performance Interconnects, New York, USA, pp. 50-57, Aug. 10-27, 2010.

Wu et al., "DARD: Distributed adaptive routing datacenter networks", Proceedings of IEEE 32nd International Conference Distributed Computing Systems, pp. 32-41, Jun. 18-21, 2012.

Ding et al., "Level-wise scheduling algorithm for fat tree interconnection networks", Proceedings of the 2006 ACM/IEEE Conference on Supercomputing (SC 2006), 9 pages, Nov. 2006.

Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.

Li et al., "Multicast Replication Using Dual Lookups in Large Packet-Based Switches", 2006 IET International Conference on Wireless, Mobile and Multimedia Networks, , pp. 1-3, Nov. 6-9, 2006.

Nichols et al., "Definition of the Differentiated Services Field (DS Field) in the IPv4 and IPv6 Headers", Network Working Group, RFC 2474, 20 pages, Dec. 1998.

Microsoft., "How IPv4 Multicasting Works", 22 pages, Mar. 28, 2003.

Suchara et al., "Network Architecture for Joint Failure Recovery and Traffic Engineering", Proceedings of the ACM SIGMETRICS joint international conference on Measurement and modeling of computer systems, pp. 97-108, Jun. 7-11, 2011.

IEEE 802.1Q, "IEEE Standard for Local and metropolitan area networks Virtual Bridged Local Area Networks", IEEE Computer Society, 303 pages, May 19, 2006.

Plummer, D., "An Ethernet Address Resolution Protocol," Network Working Group ,Request for Comments (RFC) 826, 10 pages, Nov. 1982.

Hinden et al., "IP Version 6 Addressing Architecture," Network Working Group ,Request for Comments (RFC) 2373, 26 pages, Jul. 1998.

Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.

Dally et al., "Deadlock-Free Message Routing in Multiprocessor Interconnection Networks", IEEE Transactions on Computers, vol. C-36, No. 5, May 1987, pp. 547-553.

Nkposong et al., "Experiences with BGP in Large Scale Data Centers:Teaching an old protocol new tricks", 44 pages, Jan. 31, 3014.

(56) References Cited

OTHER PUBLICATIONS

"Equal-cost multi-path routing", Wikipedia, 2 pages, Oct. 13, 2014.
Thaler et al., "Multipath Issues in Unicast and Multicast Next-Hop Selection", Network Working Group, RFC 2991, 9 pages, Nov. 2000.
Glass et al., "The turn model for adaptive routing", Journal of the ACM, vol. 41, No. 5, pp. 874-903, Sep. 1994.
Mahalingam et al., "VXLAN: A Framework for Overlaying Virtualized Layer 2 Networks over Layer 3 Networks", Internet Draft, 20 pages, Aug. 22, 2012.
Sinha et al., "Harnessing TCP's Burstiness with Flowlet Switching", 3rd ACM SIGCOMM Workshop on Hot Topics in Networks (HotNets), 6 pages, Nov. 11, 2004.
Vishnu et al., "Hot-Spot Avoidance With Multi-Pathing Over InfiniBand: An MPI Perspective", Seventh IEEE International Symposium on Cluster Computing and the Grid (CCGrid'07), 8 pages, year 2007.
NOWLAB—Network Based Computing Lab, 2 pages, years 2002-2015 http://nowlab.cse.ohio-state.edu/publications/conf-presentations/2007/vishnu-ccgrid07.pdf.
Alizadeh et al.,"CONGA: Distributed Congestion-Aware Load Balancing for Datacenters", Cisco Systems, 12 pages, Aug. 9, 2014.
Geoffray et al., "Adaptive Routing Strategies for Modern High Performance Networks", 16th IEEE Symposium on High Performance Interconnects (HOTI '08), pp. 165-172, Aug. 26-28, 2008.
Anderson et al., "On the Stability of Adaptive Routing in the Presence of Congestion Control", IEEE INFOCOM, 11 pages, 2003.
Perry et al., "Fastpass: A Centralized "Zero-Queue" Datacenter Network", M.I.T. Computer Science & Artificial Intelligence Lab, 12 pages, year 2014.
Afek et al., "Sampling and Large Flow Detection in SDN", SIGCOMM '15, pp. 345-346, Aug. 17-21, 2015, London, UK.
Amante et al., "IPv6 Flow Label Specification", Request for Comments: 6437 , 15 pages, Nov. 2011.
U.S. Appl. No. 15/050,480 office action dated Jun. 28, 2019.
U.S. Appl. No. 15/896,088 office action dated Jun. 12, 2019.
U.S. Appl. No. 15/356,588 Advisory Action dated May 23, 2019.
U.S. Appl. No. 15/356,588 office action dated Aug. 12, 2019.
U.S. Appl. No. 15/218,028 office action dated Jun. 26, 2019.
Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 29-30, 2012.
Levy et al., U.S. Appl. No. 15/896,088, filed Feb. 14, 2018.
Shpiner et al., "Dragonfly+: Low Cost Topology for Scaling Datacenters", IEEE 3rd International Workshop on High-Performance Interconnection Networks in the Exascale and Big-Data Era (HiPINEB), pp. 1-9, Feb. 2017.
U.S. Appl. No. 15/356,588 office action dated Feb. 7, 2019.
U.S. Appl. No. 15/218,028 office action dated Feb. 6, 2019.
Cao et al., "Implementation Method for High-radix Fat-tree Deterministic Source-routing Interconnection Network", Computer Science ,vol. 39, Issue 12, pp. 33-37, 2012.

* cited by examiner

CLIQUE SCHEME

FIG. 1B

BIPARTITE SCHEME

G=20 GROUPS, P=5 GLOBAL PORTS PER SPINE, S=4 SPINES PER GROUP
SUBNETWORK INTERCONNECTIONS

NETWORK TOPOLOGY HAVING MINIMAL NUMBER OF LONG CONNECTIONS AMONG GROUPS OF NETWORK ELEMENTS

TECHNICAL FIELD

Embodiments described herein relate generally to communication networks, and particularly to methods and systems for efficient interconnection among network elements.

BACKGROUND

Various topologies suitable for deploying large-scale networks are known in the art. For example, U.S. Pat. No. 9,699,067 describes a communication network that includes multiple nodes, which are arranged in groups such that the nodes in each group are interconnected in a bipartite topology and the groups are interconnected in a mesh topology. The nodes are configured to convey traffic between source hosts and respective destination hosts by routing packets among the nodes on paths that do not traverse any intermediate hosts other than the source and destination hosts.

U.S. patent application publication 2018/0302288 describes a method for networking nodes in a data center network structure, including connecting at least ten base units each including connected nodes with southbound connections of a multi-host NIC controller having northbound a higher total bandwidth than southbound, the controllers configured as dragonfly switches; connecting the ten base units with their respective controllers in a modified Peterson graph form as an intragroup network to build a super unit including three groups, where each controller uses three northbound connections for a direct connection to three other base units of the super unit, and in which two base units of each group are connected via a respective one of a fourth northbound connection to one of the other groups, and a remaining base unit not being part of one of the groups is adapted for using three northbound connections for direct connection to one base unit in each group.

SUMMARY

An embodiment that is described herein provides a design tool for network interconnection, including a user interface and a processor. The user interface includes an input device and an output device. The processor is coupled to the input device and to the output device, and is configured to receive via the input device design parameters including: (i) a number G of groups of network elements, (ii) a number S of spines associated with each group, and (iii) a number P of ports that each spine has for connecting to other spines, using short-cable connections or long-cable connections. The processor is further configured to determine an interconnection plan by specifying connections among spines belonging to different groups, in a clique scheme or in a bipartite scheme, so that for given values of G, S and P, (i) a number of the long-cable connections among the spines is minimized, and (ii) a number of inter-group connections is balanced among the G groups up to a deviation of a single connection, and to output to the output device instructions for applying the interconnection plan.

In some embodiments, the processor is configured to determine the interconnection plan by dividing the G groups into multiple disjoint subsets, and to determine short-cable connections among spines belonging to groups within each subset and among spines belonging to groups in pairs of the subsets. In other embodiments, the processor is configured to divide the G groups into a number Ns of disjoint subsets, each subset includes a number Ng of the groups, so that when a first condition—P divides G—is satisfied, Ns=G/P and Ng=P, when a second condition is satisfied—(P+1) divides G, Ns=G/(P+1) and Ng=P+1, and when a third condition—P divides (G−1) is satisfied, Ns=(G−1)/P and Ng=P. In yet other embodiments, in response to identifying that one of the first and the second conditions is satisfied, the processor is configured to specify connections: (i) among Ng spines in producing the clique scheme, and (ii) among 2·Ng spines in producing the bipartite scheme.

In an embodiment, in response to identifying that the third condition is satisfied, the processor is configured to specify connections (i) among Ng+1 spines in producing the clique scheme, and (ii) among 2·Ng spines in producing the bipartite scheme. In another embodiment, the processor is configured to define one or more virtual groups, each virtual group include S virtual spines so that a number of groups that includes the virtual groups satisfies at least one of the first, second and third conditions, and to specify the connections by omitting connections to the virtual spines. In yet another embodiment, the processor is configured to determine the interconnection plan by specifying spines connections in a number Ceiling[S/Ns] of subnetworks, the subnetworks correspond to different respective permutations of the G groups.

In some embodiments, the processor is configured to determine the interconnection plan by constraining a number of inter-group connections between any pair of the groups between Floor[Nc] and Ceiling[Nc], and Nc=P·S/(G−1). In other embodiments, the processor is configured to determine the interconnection plan by allocating spines to multiple racks, so that the spines of each clique scheme reside in a same rack, and the spines of each bipartite scheme reside in a same rack. In yet other embodiments, the processor is configured to identify unconnected ports in spines of the clique schemes or of the bipartite schemes, and to determine short-cable connections among unconnected ports of spines in a same rack, and long-cable connections among unconnected ports of spines belonging to different racks.

There is additionally provided, in accordance with an embodiment that is described herein, a method for designing a network interconnection, including receiving design parameters including: (i) a number G of groups of network elements, (ii) a number S of spines associated with each group, and (iii) a number P of ports that each spine has for connecting to other spines, using short-cable connections or long-cable connections. An interconnection plan is determined by specifying connections among spines belonging to different groups, in a clique scheme or in a bipartite scheme, so that for given values of G, S and P, (i) a number of the long-cable connections among the spines is minimized, and (ii) a number of inter-group connections is balanced among the G groups up to a deviation of a single connection. The interconnection plan is applied by connecting among the spines in accordance with the connections specified in the interconnection plan.

There is additionally provided, in accordance with an embodiment that is described herein, a communication network, including a number G of groups of network elements, each group includes a number S of spines, and each spine includes a number P of ports for connecting to other spines, using short-cable connections or long-cable connections. Spines belonging to different groups are interconnected in a clique scheme or in a bipartite scheme. Each clique scheme and each bipartite scheme is assigned to reside in a rack, so that spines having a port among the P ports that is not connected in a clique or a bipartite scheme are interconnected using short-cable connections within a common rack, and using long-cable connections between different racks. For given values of G, S and P, (i) a number of the long-cable connections among the spines is minimized, and (ii) a number of inter-group connections between pairs of groups equals Floor[P·S/(G−1)] or Ceiling[P·S/(G−1)].

These and other embodiments will be more fully understood from the following detailed description of the embodiments thereof, taken together with the drawings in which:

DETAILED DESCRIPTION OF EMBODIMENTS

Overview

In various computing systems, such as data centers, a large number of network nodes communicate with one another over a packet network. The underlying network typically comprises network elements such as switches or routers that connect to one another and to the network nodes using physical links. Typically, the network topology employed has a major impact on the system performance in terms of data rate, latency and cost.

Embodiments that are described herein provide systems and methods for designing and implementing a large-scale network that aims to reduce interconnection cost by minimizing the required number of long-cable connections.

The disclosed embodiments refer mainly to a hierarchical topology in which network nodes connect directly to leaf network elements, which in turn connect to spine network elements. In the context of the present disclosure and in the claims, leaf and spine network elements are also referred to respectively as "leaves" and "spines," for brevity.

The lengths of the physical links in the network depend on actual physical distances between the connected elements. The usable length of a physical link is limited by the data rate transmitted over the link. For example, electrical cables support data rates of 100 Gigabps up to a distance of about 2.5 meters. Longer connections at the same rate require the use of optical cables, which are significantly more costly than electrical cables.

In some embodiments, the network elements comprising the network are divided into multiple predefined groups. Due to physical limitations, network elements belonging to different groups typically reside at large distances from one another, which require long-cable connections.

In the disclosed embodiments, spines are mounted within racks, separately from the leaves. Spines belonging to the same rack are interconnected using short-cable connections, whereas spines that reside in different racks are interconnected using long-cable connections. Inter-group connections are made by connecting between spines of the respective groups. The ports of a spine that are used for inter-group connections are also referred to herein as "global ports."

In some applications, physical elements of the network are constrained to predefined values. Such parameters comprise, for example, "G"—the number of groups, "S"—the number of spines per group, "P"—the number of global ports per spine, and "R"—the number of spines per rack. Designing an interconnection plan for a large-scale network, given an arbitrary combination of the design parameters, is a challenging task.

In some embodiments, a method is disclosed for planning and implementing an interconnection plan among the spines. The interconnection plan specifies connections among spines belonging to different groups that provide a balanced connectivity among the groups. The spines are interconnected in clique and bipartite schemes, and are allocated to racks. The interconnection plan is designed so that (i) a number of the long-cable connections among the spines is minimized, and (ii) the number of inter-group connections is balanced among the G groups up to a deviation of a single connection.

In some embodiments, depending on G and P, the plurality of the G groups is divided into Ns disjoint subsets of size Ng, wherein short-cable connections are determined among spines belonging to groups within each subset and among spines belonging to groups in pairs of the subsets. In some embodiments, virtual groups are added to satisfy a condition between G and P, and G is increased accordingly. Virtual spines of the virtual groups, however, are not actually connected.

In an embodiment, the interconnection plan specifies spines connections in a number Ceiling[S/Ns] of subnetworks, wherein the subnetworks correspond to different respective permutations of the G groups.

In some embodiments, the interconnection plan specifies allocation of spines belonging to clique and bipartite schemes to racks. Global ports of spines belonging to clique or bipartite structures, and that remain unused, are connected using short-cable connections in the same rack, and using long-cable connections between different racks.

In the disclosed techniques, an efficient network topology having a minimal number of long-cable connections among spines is designed and implemented, thus reducing the interconnection cost significantly. The underlying design method is flexible and is suitable for various combinations of design parameters.

System Description

Figure 1:
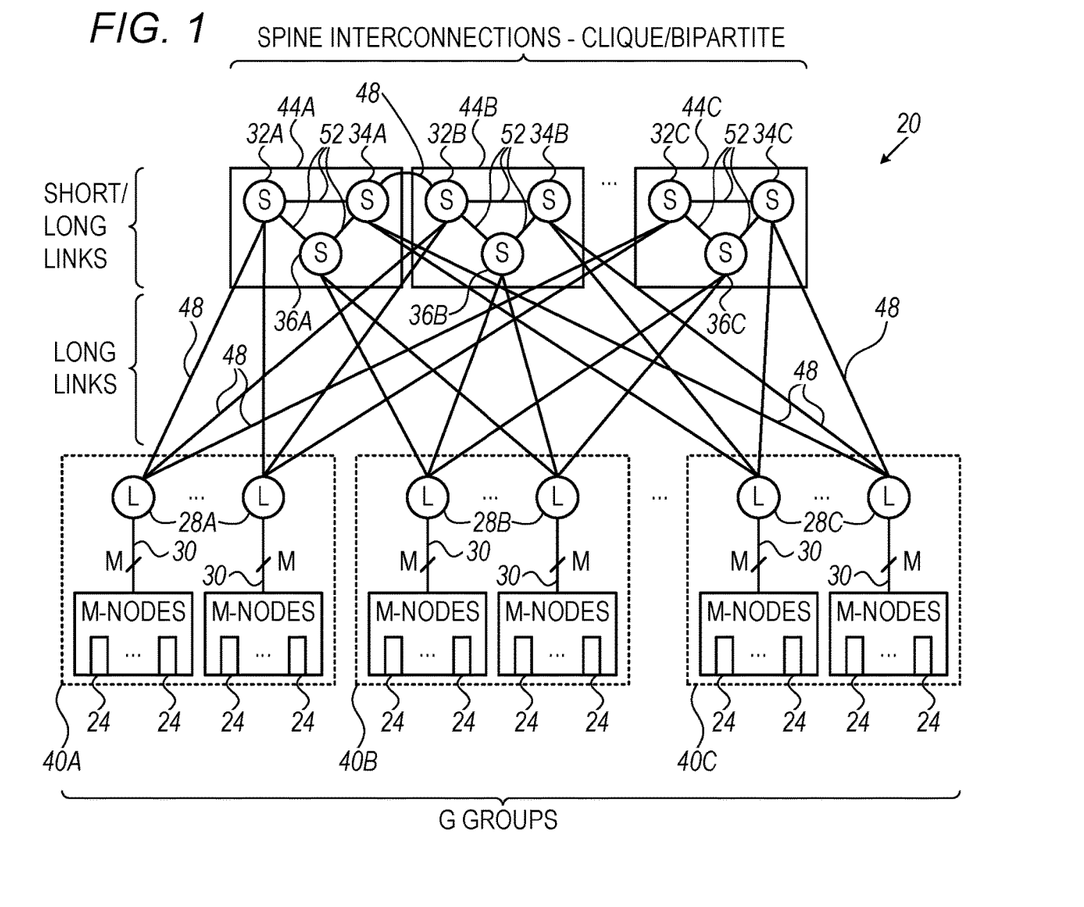
FIG. 1 is a block diagram that schematically illustrates a computing system having an efficient interconnection topology, in accordance with an embodiment that is described herein.

FIG. 1 is a block diagram that schematically illustrates a computing system 20 having an efficient interconnection topology, in accordance with an embodiment that is described herein.

In computing system 20, network nodes 24 communicate with one another over a hierarchical network comprising a first level of leaf network elements 28 and a second level of spine network elements 32, 34 and 36. For the sake of brevity, leaf and spine network elements are also referred to herein simply as "leaves" and "spines" respectively. In the present example, each leaf is coupled to M network nodes 24 using M respective links 30. Leaves 28 and spines 32 may comprise any suitable network element such as a switch or router, and may operate in accordance with any suitable communication protocol such as, for example, Ethernet or InfiniBand.

Computing system 20 may be used in various applications in which a large number of nodes or processors communicate with one another, for example, in computing clusters such as High-Performance Computing (HPC) and large-scale data centers. In practical implementations, computing system 20 supports high-rate communication among thousands of network nodes.

The network elements comprising the network in FIG. 1 are divided into multiple groups 40, wherein each group comprises both leaves and spines. In the example of FIG. 1, group 40A comprises leaves 28A and spines 32A, 32B and 32C. Similarly, group 40B comprises leaves 28B and spines 34A, 34B and 34C, whereas group 40C comprises leaves 28C and spines 36A, 36B and 36C.

In FIG. 1, a leaf connect to other leaves only via one or more spines, and not directly. Due to physical space limitations, leaves 28 connect to spines residing in cabinets 44 using long links 48. A "cabinet" is also referred to herein as a "rack". Each cabinet 44 comprises spines belonging to different groups, such as, for example, spines 32A, 34A and 36A in cabinet 44A. Spines within a cabinet are connected to one another in one or more predefined structures, using short links 52. The spine-to-spine connections (52) are also referred to as "global connections," enabling communication between network nodes that are coupled to leaves of different groups.

In the description that follows, "short links" are also referred to as "short-cable links" and "long links" are also referred to as "long-cable links."

In the context of the present disclosure and in the claims, the terms "short-cable connection" and "long-cable connection" refer to physical links connecting spines within the same cabinet and between different cabinets, respectively. Passive copper cables support reliable data delivery at a data rate of 100 Gigabps along distances up to about 2.5 meters. This means that for such a data rate copper-based short-cable connections are can be used up to 2.5 meters and optical long-cable connections are used for distances above 2.5 meters. Alternatively, other data rates and corresponding cable lengths can also be used.

In some embodiments, a path between two leaves belonging to a common group passes via a single spine of the common group. For example, leaves 28A in group 40A may communicate with one another via one or more parallel connections, wherein each of the parallel connections passes via a respective spine such as, 32A, 32B or 32C. In an embodiment, a path between leaves belonging to different groups, passes via two spines associated with the respective groups. For example, the left side leaf 28A in group 40A may connect to the right side leaf 28C of group 40C via spines 32A and 34A in cabinet 44A. Alternative paths comprise spines 32B and 34B in cabinet 44B, and spines 36A and 36B in cabinet 44C.

In some embodiments, spines located in the same cabinet may be interconnected using a clique scheme, a bipartite scheme or both. In a fully connected clique scheme, every two spines are interconnected. In a fully connected bipartite scheme, spines are interconnected between two disjoint groups of the spines, so that each spine connects to all of the spines in the opposite group.

In some embodiments, depending on the underlying design parameters, spines in different cabinets may be connected using long links 48. This may occur when spines in different cabinets have global ports not participating in the clique and bipartite schemes.

Figure 1A:
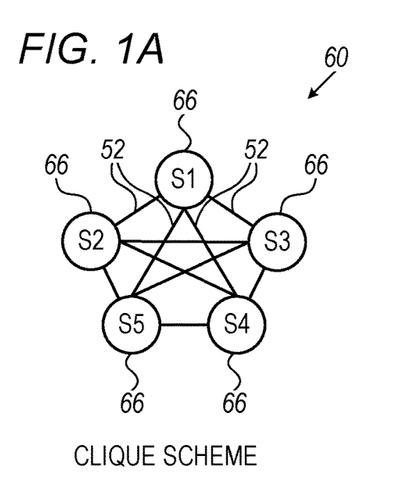
FIGS. 1A and 1B are diagrams that schematically illustrate a clique scheme and a bipartite scheme that can be used for global connections among spines, in accordance with an embodiment that is described herein.
Figure 1B:
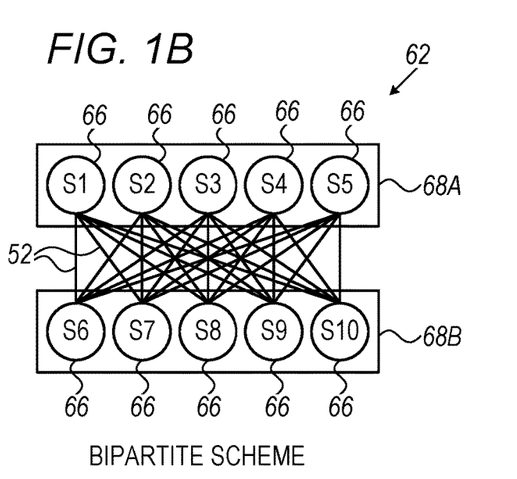

FIGS. 1A and 1B are diagrams that schematically illustrate a clique scheme 60 and a bipartite scheme 62 that can be used for global connections among spines, in accordance with an embodiment that is described herein. In some embodiments, spines 66 in FIGS. 1A and 1B may be used for implementing spines 32, 34 and 36 of FIG. 1.

In FIG. 1A, the spines denoted S1 ... S5 are interconnected using short links 52 in a clique scheme, wherein S1 ... S5 are associated with five different groups. In a fully connected clique scheme built using P spines, each spine connects to (P−1) other spines. In FIG. 1B, the spines denoted S1 ... S10 are divided into disjoint groups 68A and 68B comprising spines {S1 ... S5} and {S6 ... S10} respectively. Spines in the disjoint groups are connected in a bipartite scheme using short links 52. Spines S1 ... S10 are associated with ten respective groups. In a fully connected bipartite scheme, in which each of the disjoint groups has P spines, each spine connects to P other spines of the other group.

In some embodiments, the number of global ports available exceeds the number of intra-clique connections. This may happen, for example, when COND1 is satisfied. In general, when constructing a clique scheme using P spines that each has P'≥P global ports, P'−P+1 global ports remain unused, in each of the clique spines. In such embodiments, global ports not participating in the clique scheme can be used for making multiple connections between spines of the clique, or for connecting between different clique structures within the same cabinet, using short-cable connections. Alternatively, spines having spare global ports in different cabinets can be connected using long-cable connections.

In some embodiments, the number of global ports per spine is insufficient for connecting each spine in a bipartite scheme to all the spines in the opposite group of the two disjoint groups comprising the bipartite scheme. This may happen, for example, when COND2 is satisfied. In an embodiment, a bipartite scheme comprises two disjoint groups of P spines, wherein each spine has only P'<P global ports. In such an embodiment, a fully connected bipartite scheme cannot be constructed, and therefore a partial bipartite scheme is constructed instead.

Network Node and Network Element Architecture

Figure 2:
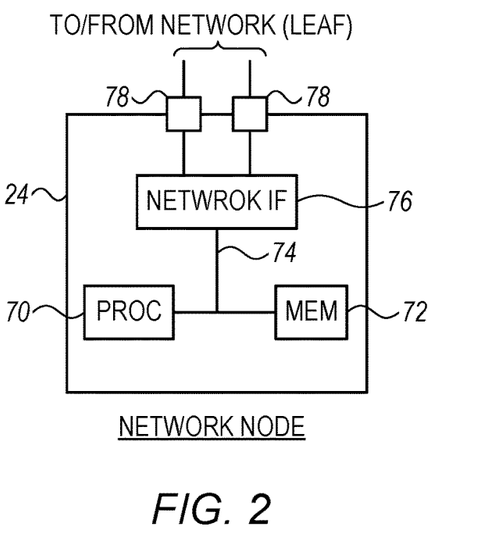
FIG. 2 is a block diagram that schematically illustrates a network node, in accordance with an embodiment that is described herein.

FIG. 2 is a block diagram that schematically illustrates network node 24, in accordance with an embodiment that is described herein. Network node 24 comprises a processor 70 coupled to a memory 72 using a suitable bus 74. The network node further comprises a network interface 76, coupled to bus 74, for connecting to a leaf 28 of the network using one or more ports 78. Network interface 76 may comprise a network interface controller (NIC). Alternatively, in connecting to an InfiniBand (IB) network, the network interface may comprise a host channel adapter (HCA). Network interface handles data communication between the network node and other network nodes in computing system 20, by transmitting and receiving packets to and from the network via ports 78.

Figure 3:
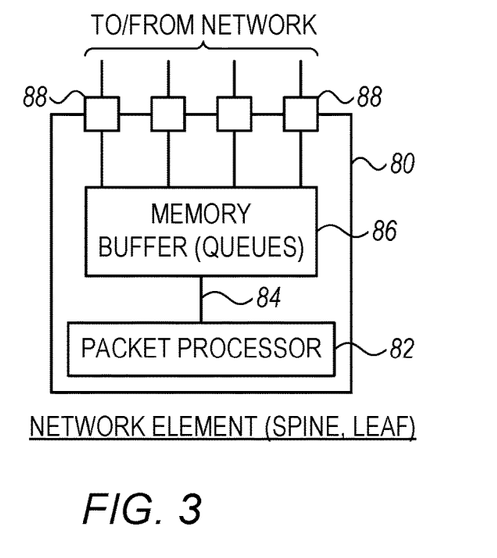
FIG. 3 is a block diagram that schematically illustrates a network element, in accordance with an embodiment that is described herein.

FIG. 3 is a block diagram that schematically illustrates network element 80, in accordance with an embodiment that is described herein. Network element 80 can be used in implementing leaves 28 and spines 32, 34 and 36 of FIG. 1. Network element 80 comprises a packet processor 82 for processing incoming and outgoing packets, a memory buffer 86, and multiple ports 88 coupled to the network.

In the ingress direction, the packet processor applies to packets received in the network element via ports 88, various processing such as verifying the correctness of the data in the packet payload, packet classification and prioritization, and routing. The packet processor typically checks certain fields in the packets headers for the purpose of packet classification and routing. The header fields contain addressing information, such as source and destination addresses and port numbers, and the underlying network protocol used. The packet processor stores processed packets that are awaiting transmission in one or more queues in memory buffer 86.

In the egress direction, packet processor 82 schedules the transmission of packets stored in the queues in memory buffer 86 via respective output ports using any suitable arbitration scheme, such as, for example, a round-robin scheduling scheme.

A Tool for Designing Global Interconnection Plan

Figure 4:
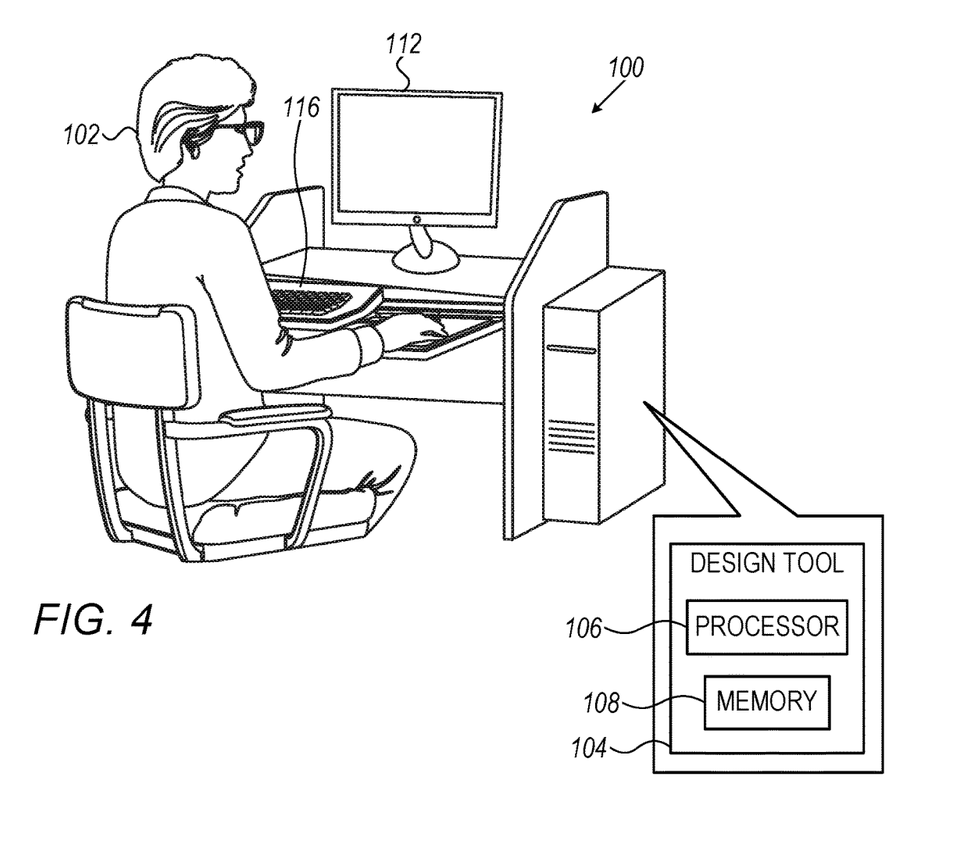
FIG. 4 is a diagram that schematically illustrates a design environment in which a designer operates a design tool for making global connections in the computing system of FIG. 1, in accordance with an embodiment that is described herein.

FIG. 4 is a diagram that schematically illustrates a design environment 100 in which a designer 102 operates a design tool 104 for making global connections in computing system 20 of FIG. 1, in accordance with an embodiment that is described herein.

Design tool 104 comprises a processor 106 and a memory 108, and may be implemented in any suitable computer such as a server or a laptop. The processor is coupled to a user output device 112, such as a display, and to a user input device 116, such as a keyboard. Memory 108 may comprises any suitable type of memory of any suitable storage technology. Memory 108 may be coupled to the processor using a local bus, or using a suitable interface such as USB, for example.

Processor 106 typically runs various programs and applications that are installed, for example, in memory 108. In the present example, processor 106 runs a design tool application for designing an interconnection plan among spine network elements. The interconnection plan may be designed for connecting among spines 32, 34 and 36 in FIG. 1, using a minimal number of long-cable connections.

In some embodiments, designer 102 provides the design tool with design parameters specifying the design requirements. In response to the parameters, processor 106 generates an interconnection plan, and outputs to output device 112 readable instructions for implementing the interconnection plan. The designer (or some other user) allocates spines to cabinets and connects among the spines within each cabinet and possibly between cabinets, in accordance with the interconnection plan.

The example design tool above, in which the user interfaces with processor 106 using a keyboard and a display is a non-limiting example. In alternative embodiments, other suitable interfacing methods and devices can also be used. For example, the processor may read the design parameters from a file in memory.

The configurations of computing system 20, network node 24, network element 80 and design tool 104 shown in FIGS. 1-4 are example configurations, which are chosen purely for the sake of conceptual clarity. In alternative embodiments, any other suitable computing system, network node, network element and design tool configurations can be used. Some elements of network node 24, network element 80 and design tool 104, such as processor 70, memory 72, network interface 76, packet processor 82, memory buffer 86, processor 106 and memory 108 may be implemented in hardware, e.g., in one or more Application-Specific Integrated Circuits (ASICs) or Field-Programmable Gate Arrays (FPGAs). Additionally or alternatively, some elements, for example processor 70 of network node 24, packet processor 82 of network element and/or processor 106 of design tool 104, can be implemented using software, or using a combination of hardware and software elements. Each of memory 72, memory buffer 86 and memory 108 may be implemented using any suitable memory, such as Random Access Memory (RAM).

In some embodiments, some of the functions of processor 70, packet processor 82, and/or processor 106 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Subnetwork Topology and Design Methods

In some embodiments, the global interconnections among the spines in FIG. 1 are arranged in one or more subnetworks. To construct a subnetwork, the plurality of G groups is divided into multiple subsets. Spines belonging to groups of the same subset are interconnected in a clique scheme, and spines belonging to different subsets are interconnected in a bipartite scheme, as will be described in detail below.

Figure 5:
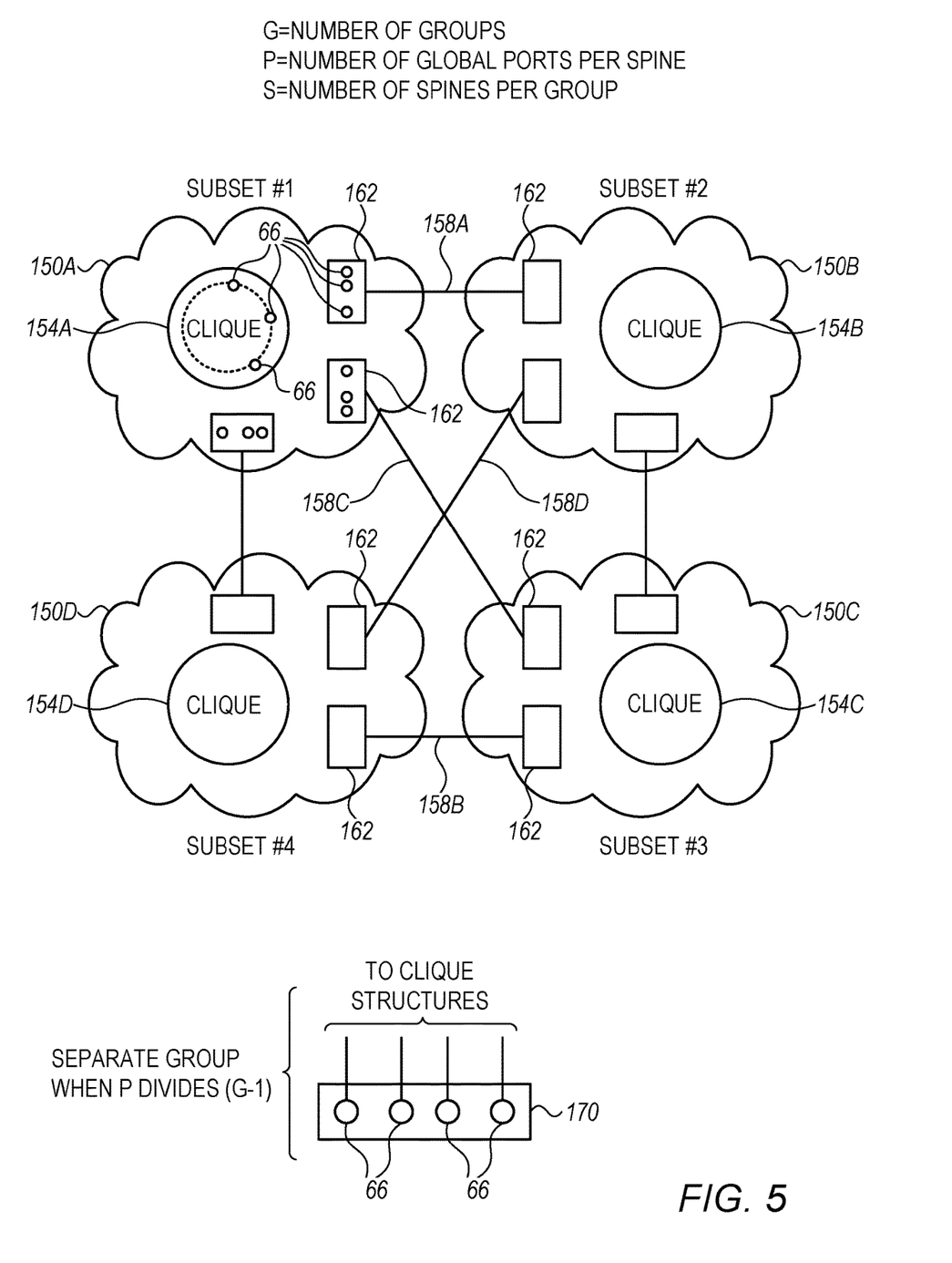
FIG. 5 is a diagram that schematically illustrates an interconnection plan for a single subnetwork, in accordance with an embodiment that is described herein.

FIG. 5 is a diagram that schematically illustrates an interconnection plan for a single subnetwork, in accordance with an embodiment that is described herein. Depending on the design parameters, the interconnection plan in FIG. 5 may not cover the entire global ports. Rules for connecting global ports that remain unconnected will be described further below. The actual subnetwork topology depends on the design parameters: G—the number of groups, S—the number of spines per group and P—the number of global ports per spine.

To determine the subnetwork interconnections among the G groups, the plurality of the G groups is divided into multiple disjoint subsets 150. In the example of FIG. 5, the G groups are divided into four disjoint subsets denoted 150A . . . 150D.

Let Ns denote the number of subsets 150, and let Ng denote the number of groups in each subset. The values of Ns and Ng depend on the parameters G and P. Table 1 summarizes three conditions between G and P, denoted COND1, COND2 and COND3, and corresponding expressions for calculating Ns and Ng.

TABLE 1

Ns and Ng as a function of G and P.

| | COND1 | COND2 | COND3 |
|---|---|---|---|
| condition | P divides G | (P + 1) divides G | P divides (G − 1) |
| Ns | G/P | G/(P + 1) | (G − 1)/P |
| Ng | P | (P + 1) | P |

Numerical values of Ns and Ng for example values of G and P are given in Table 2.

TABLE 2

Values of Ns and Ng for example combinations of G and P.

| | COND1 | COND2 | COND3 |
|---|---|---|---|
| G, P | G = 20, P = 5 | G = 20, P = 4 | G = 21, P = 5 |
| Ns | Ns = 20/5 = 4 | Ns = 20/(4 + 1) = 4 | Ns = (21 − 1)/5 = 4 |
| Ng | Ng = 5 | Ng = 4 + 1 = 5 | Ng = 5 |

As shown in FIG. 5, each subset 150 is associated with a respective clique structure 154. The clique structure is constructed for a subset 150 by selecting a spine from each group in that subset, and connecting among the selected spines in a clique scheme using short-cable connections. The clique structure in each subset comprises Ng spines. In addition, the two subsets in each pair of subsets 150 share a respective bipartite structure 158. For example, in FIG. 5, subsets 150A and 150B share bipartite 158A. Subset 150A additionally shares respective bipartite structures with subsets 150C and 150D. For given first and second subsets, the bipartite structure is constructed by selecting a spine from each group of the first subset and a spine from each group of the second subset to produce two respective disjoint groups 162, and connecting the selected spines of disjoint groups 162 in a bipartite scheme using short-cable connections. Bipartite structure 158 comprises 2·Ng spines.

The plurality of G groups can be represented, for example, by a list of indices {1 ... G}. For each of the G and P combinations (G=20, P=5), (G=20, P=4) and (G=21, P=5) of Table 2 above, a list of indices {1 ... 20} can be partitioned into four disjoint subsets {1 ... 5}-150A, {6 ... 10}-150B, {11 ... 15}-150C and {16 ... 20}-150D. This partition is given by way of example and other suitable partitions can also be used. In the present example, clique structure 154 can be implemented using clique scheme 60 of FIG. 1A, and bipartite structure 158 can be implemented using bipartite scheme 62 of FIG. 1B. For example, clique 154A is constructed using five spines belonging to respective groups {1,2,3,4,5}. As another example, bipartite 158D is constructed using five spines belonging to groups {6,7,8,9,10} and other five spines belonging to respective groups {16,17,18,19,20}.

In some embodiments, the number of global ports per spine does not match the number of connections in a clique or bipartite structure. For example, when P divides G (COND1 is satisfied), the clique structure has one port among the P ports in each spine that remains unconnected. As another example, when (P+1) divides G (COND2 is satisfied), the number of ports 2·P in the bipartite scheme is insufficient for constructing a fully connected bipartite scheme.

When P divides (G−1) (COND3 is satisfied), one of the G groups is not partitioned into any of the subsets. In FIG. 5, a separate group 170 comprises S spines 66 is used in this case. As an example, for G=21, P=5, the first 20 groups of the list of group indices {1 ... 21} are partitioned into four subsets (each comprising Ng=5 groups) as described above, leaving the group corresponding to index 21 separated. Note that similarly to the COND1 case, since the clique structure comprises P spines having P ports, P of the overall $P^2$ ports in the clique structure remain unconnected. In this case, for each of the Ns subsets, Ng=P spines are selected from the separate group 170, and are connected using short-cable connections to complete clique structures 154 to be fully connected.

In the subnetwork topology, each of the G groups contributes one spine for constructing a clique structure, and Ns−1 spines for constructing a bipartite structure. A subnetwork in which each of the clique schemes has P spines and each of the bipartite schemes has 2·P spines is referred to herein as a "full subnetwork." For constructing a full subnetwork, the number of spines per group (S) should satisfy S≥Ns, wherein the value of Ns depends on G and P as depicted in Table 1 above. The number of spines required for constructing a full subnetwork is given by Ns·G.

Although in the example of FIG. 5 the subnetwork is constructed by dividing the plurality of G groups into multiple disjoint subsets, this is not mandatory, and in some embodiments only one subset applies, in which case Ns=1. This may occur, for example, when one of the conditions P=G, (P+1)=G and P=(G−1) is satisfied. In such embodiments, the subnetwork is constructed by selecting G spines from among the respective G groups, and the connecting the selected spines in a clique scheme.

In some embodiments, the parameters G and P do not satisfy any of the three conditions COND1, COND2 and COND3 of Table 1. In such embodiments, before partitioning the plurality of groups into the disjoint subsets, one or more virtual groups are defined, wherein each virtual group comprises S virtual spines. Let Gv denote the number of virtual groups, and let G' denote the total number of groups, i.e., G'=(G+Gv). In an embodiment, the number of virtual groups Gv is selected so that G' and P satisfy one of the conditions COND1, COND2 and COND3 of Table 1. The subnetwork interconnection is then designed, as described above, using the parameters G', P and S, wherein G' replaces the original value G. In such embodiments, short-cable connections that involve virtual spines belonging to the virtual groups are omitted. Using virtual groups may increase the number of unconnected ports in the subnetwork.

In some embodiments, connecting global ports in constructing a subnetwork is carried out sequentially among the subsets so as to distribute unconnected ports in a balanced manner among the subsets. For example, the subsets (150 in FIG. 5) are scanned sequentially and cyclically, and at each scanning step, one bipartite scheme is made between two subsets before proceeding to the subsequent subset.

In some embodiments, Ns and S satisfy the condition Ns<S for the given design parameters G, P and S. In such embodiments, the method described above for designing and implementing an interconnection plan for one subnetwork can be used for constructing multiple subnetworks. In general, the number of subnetworks equals Ceiling[S/Ns]. When Ns divides S, a number (S/Ns) of full subnetworks can be constructed. Otherwise, one of the subnetworks is constructed as a "partial subnetwork" comprising a smaller number of spines than a full subnetwork. In general, a partial subnetwork typically comprises a smaller number of clique and/or bipartite schemes than a corresponding full subnetwork.

In some embodiments, in order to balance the usage of spines across groups, different permutations of the G groups {1 ... G} are generated for the different subnetworks. For example, for G=20, P=5 and S=8, two full subnetworks can be constructed. The first subnetwork is constructed, for example, using the four subsets {1,2,3,4,5}, {6,7,8,9,10}, {11,12,13,14,15} and {16,17,18,19,20}. The four subsets for the second subnetwork are given, for example, by {1,4,7,10,13}, {16,19,2,5,8}, {11,14,17,20,3}, and {6,9,12,15,18}.

Deriving a permutation of the list {1 ... G} can be done using any suitable method. In an example embodiment, the permutation may be defined by scanning the list {1 ... G} cyclically while jumping over X indices at a time, wherein X and G are coprime integers, i.e., the only positive integer that divides both X and G is 1. Generating permuted lists of {1 ... G} using X jumps so that X and G are coprime integers, results in a balanced usage of spines across the groups.

In some embodiments, the number of connections assigned to each pair of the G groups is balanced among the groups. Since S spines having P ports per spine are available per group, an average number Nc=P·S/(G−1) of connections can be applied between pairs of groups, using global ports of spines. Let NcMin and NcMax denote the minimal and maximal numbers of group-to-group connections. In some embodiments, McMin and McMax are calculated as McMin=Floor[Nc] and McMax=Ceiling[Nc], so that the numbers of group-to-group connections are balanced up to a deviation of a single connection. In some embodiments, the number of inter-group connections in a subnetwork, before handling any remaining unconnected global ports, is constrained not to exceed NcMin.

A Method for Designing an Interconnection Plan Among Global Ports of Spines

Figure 6:
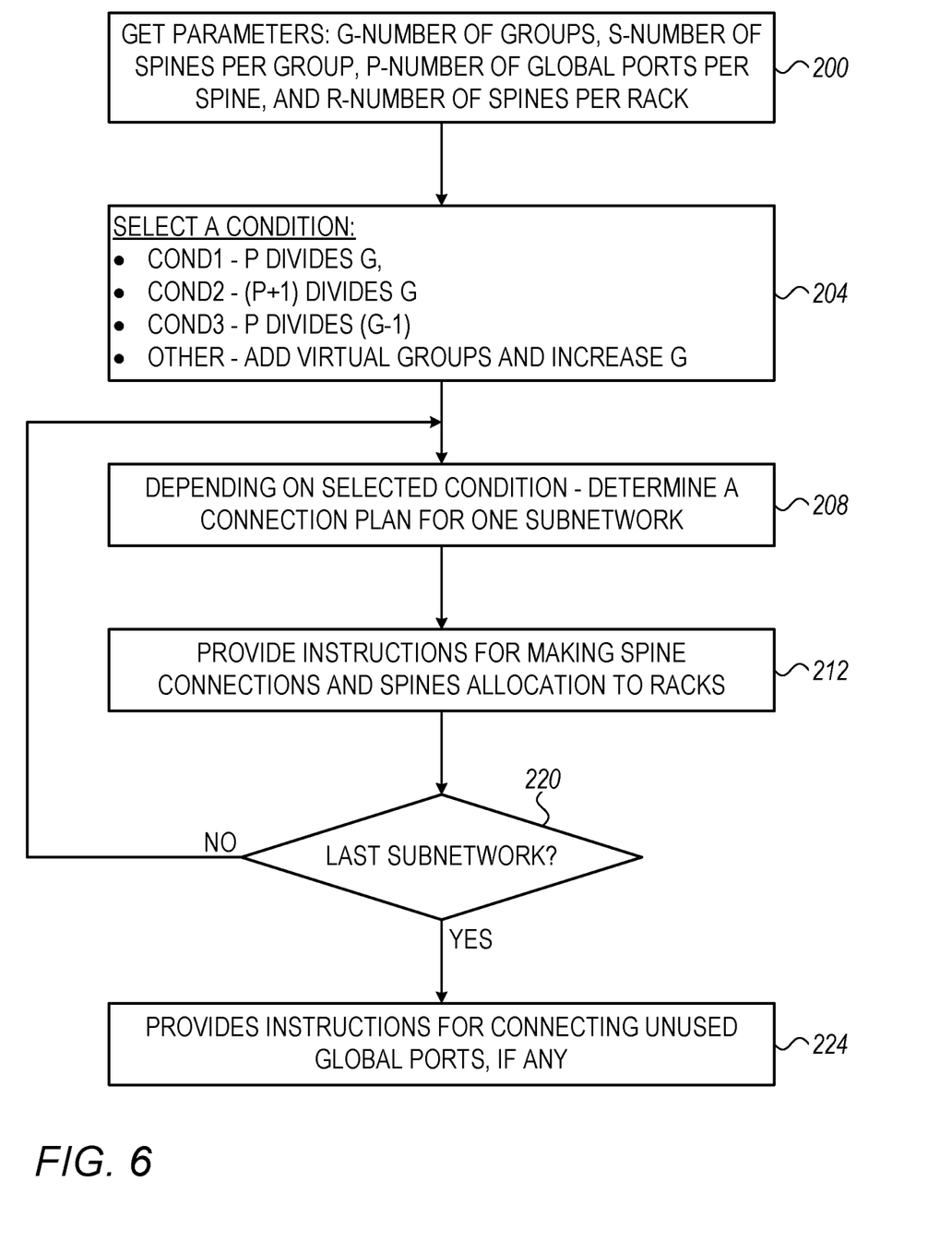
FIG. 6 is a flow chart that schematically illustrates a method for designing an interconnection plan that minimizes the number of long-cable connections among spines, in accordance with an embodiment that is described herein.

FIG. 6 is a flow chart that schematically illustrates a method for designing an interconnection plan that minimizes the number of long-cable connections among spines, in accordance with an embodiment that is described herein. The method will be described as being executed by processor 106 of design tool 104 of FIG. 4 above.

The method begins with processor 106 receiving design parameters from designer 102 via input device 116, at an input step 200. In the present example, the parameters refer to design requirements of the network in FIG. 1. In some embodiments, the parameters comprise: G—the number of groups in computing system 20, S—the number of spines per group, P—the number of global ports per spine and R—the number of spines per rack.

At a condition checking step 204, the processor checks whether the parameters G and P satisfy one of conditions COND1, COND2 and COND3 of Table 1.

In some embodiments, at step 204 multiple conditions are satisfied simultaneously. For example, the parameters G=20, P=4 satisfy both the conditions COND1 and COND2. In such embodiments, the processor selects one of the satisfied conditions using any suitable method, e.g., arbitrarily.

In some embodiments, the received parameters G and P fail to satisfy all of conditions COND1, COND2 and COND3 in Table 1. Example non-limiting such parameters are G=22, P=5. In such cases, the processor defines one or more virtual groups, wherein each virtual group comprises S virtual spines, and increases G accordingly, as described above with reference to FIG. 5. The processor then proceeds with the updated G value and with the original P and S values received at step 200.

At a subnetwork construction step 208, the processor produces an interconnection plan of one subnetwork. The actual interconnection plan depends on the design parameters and the condition that was selected at step 204. The interconnection plan specifies interconnections among spines in clique and bipartite structures, as well as allocation of the spines into racks. When at step 200 virtual groups were defined, the processor omits in designing the interconnection plan, connections specified for virtual spines of these virtual groups. The processor determines the interconnection plan, including allocation of spines into racks so that the subnetwork interconnect comprises a minimal number of long-cable connections. Detailed methods for determining interconnections for one subnetwork ae described, e.g., with reference to FIG. 5 above.

At an output step 212, the processor provides instructions to a user, e.g., via output device 112, for applying the designed interconnection plan. The processor provides, for example, readable instructions for connecting among spines and for allocating spines into racks. In some embodiments, the processor assigns interconnected clique and bipartite structures in a rack, and when the overall number of spines exceeds the rack capacity R, opens a subsequent rack. Note that in general, all of the spines of a clique structure are allocated to a common rack. Similarly, all of the spines of a bipartite structure are allocated to a common rack.

At a loop handling step 220, the processor checks whether interconnection for the last subnetwork has been designed, and loops back to step 208 when planning an interconnection for a subsequent subnetwork is required. For example, at step 220, the processor checks whether there are any spines available among the total S·G spines that do not belong to any of the subnetworks already processed, and if so, loops back to step 208. Alternatively, the processor may calculate the total number of subnetworks–Ceiling[S/Ns], and use it for handling the loop.

When at step 220 the interconnection of the last subnetwork has been processed, the processor proceeds to a second-phase step 224, at which the processor specifies interconnections among global ports that were not yet connected. Global ports may remain unconnected in the subnetworks, depending on the design parameters G, P and S. Unconnected global ports may remain, for example, when the G groups contain one or more virtual groups.

Specifically at step 224, the processor specifies connections and provides instructions for connecting the remaining global ports (e.g., separately for each subnetwork) based on the following rules, which take into consideration the minimal (NcMin) and maximal (NcMax) numbers of connections between groups:

1. Connect between spines within a rack (using short-cable connections) wherein the spines belong to groups that are interconnected using a number of global connections smaller than NcMin.
2. Connect between spines belonging to different racks (using long-cable connections) wherein the spines belong to groups that are interconnected using a number of global connections smaller than McMin.
3. Connect spines within a rack (using short-cable connections) wherein the spines belong to groups that are interconnected using a number of global connections smaller than NcMax.
4. Connect spines belonging to different racks (using long-cable connections) wherein the spines belong to groups that are interconnected using a number of global connections smaller than NcMax.
5. Connect remaining unconnected global ports, if any.

Example Interconnection Plan Design

Figure 7:
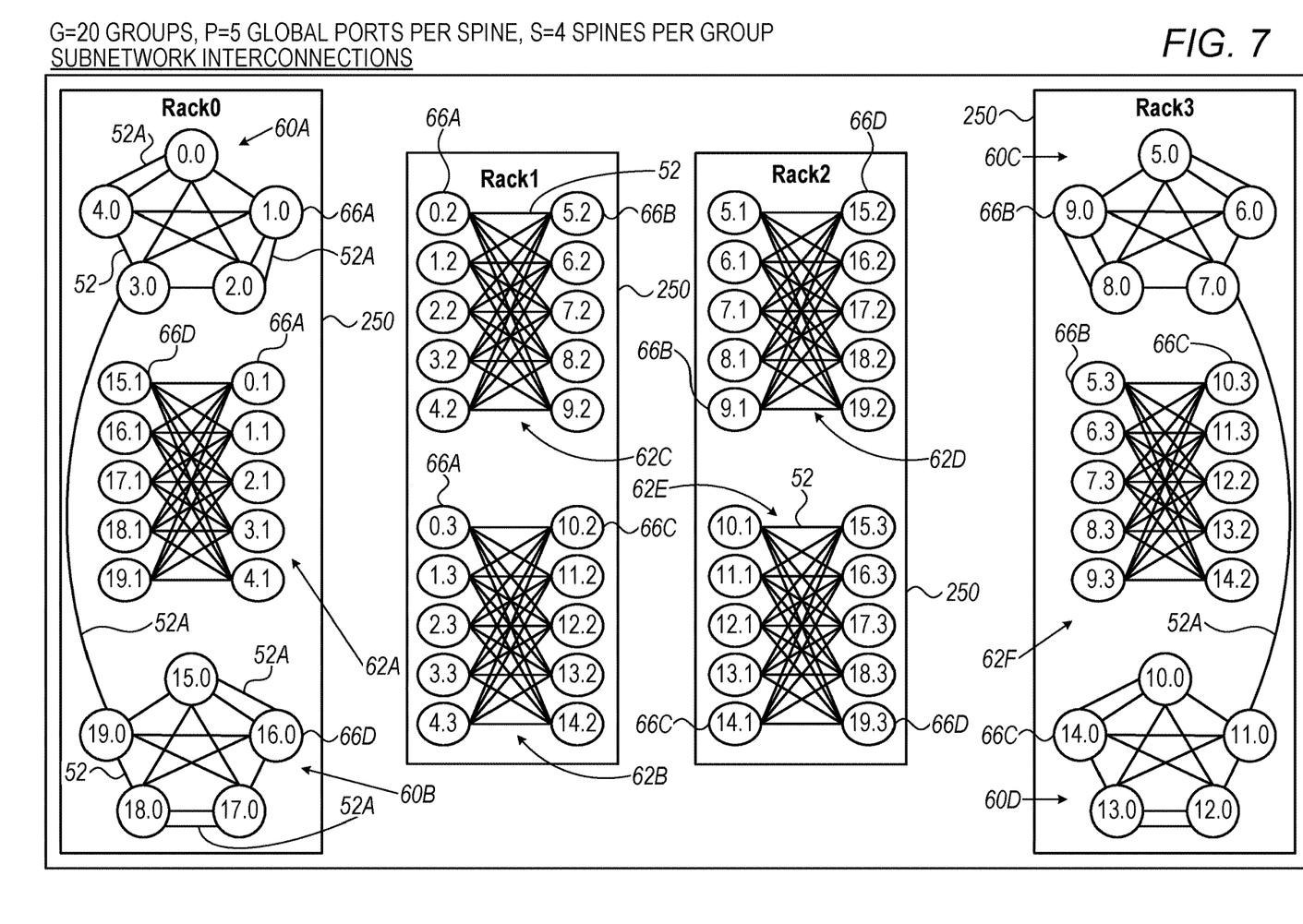
FIG. 7 is a diagram that schematically illustrates example interconnections and rack allocation of subnetwork spines, in accordance with an embodiment that is described herein.

FIG. 7 is a diagram that schematically illustrates example interconnections and rack allocation of subnetwork spines, in accordance with an embodiment that is described herein. The example subnetwork in FIG. 7 is designed for G=20 groups, S=4 spines per group, P=5 global ports per spine and R=20 spines per rack.

The spines in FIG. 7 are labeled using symbols of the form g.x, wherein g=0 . . . 19 denotes a group number, and x=0 . . . 3 denotes a spine number. Since P divides G, COND1 is satisfied and each subset contains P groups. Spines 66A, 66B, 66C and 66D correspond respectively to subsets containing the groups {0 . . . 4}, {5 . . . 9}, {10 . . . 14} and {15 . . . 19}.

The subnetwork in FIG. 7 comprises four clique structures 60A . . . 60D and six bipartite structures 62A . . . 62F. The spines of the clique and bipartite structures are interconnected using short-cable links 52. Each clique structure comprises five spines (P=5) belonging to groups of a common subset. For example, spines 66A numbered 0.0 . . . 4.0 are connected in clique structure 60A. Each bipartite structure comprise 2·P=10 spines belonging to groups of two different subsets. For example, spines 66A numbered 0.2 . . . 4.2 and spines 66B numbered 5.2 . . . 10.2 are connected in bipartite structure 62C.

In the present example, since G and P satisfy COND1 of Table 1, each spine in clique structures 60 has a global port, unused in the clique interconnections. These unconnected ports are connected within the same clique structure and between different clique structures within a rack. Short-cable connections among such unused global ports are denoted 52A in the figure.

The spines of each subnetwork are mounted within one or more racks 250. In the present example, each rack 250 comprises up to 20 spines. The spines of the interconnected clique and bipartite structures can be allocated to the racks in various ways. For example, in some embodiments, clique and bipartite structures are allocated to racks in the same order in which they are created. In such embodiments, all of the clique structures of a subnetwork are allocated to racks after allocating all of the bipartite structures of that subnetwork to racks. In FIG. 7, each of the racks denoted Rack0 and Rack3 comprises two clique structures and one bipartite structure, whereas each of the racks denoted Rack1 and Rack2 comprises two bipartite structures. Alternatively, the four cliques may reside in one rack, and each of the other three racks comprises two bipartite structures.

In the example of FIG. 7, the number of spines per group is S=4, which results in a single full subnetwork. Alternatively, in a similar example for which G=20, P=5 and S=8, two full subnetworks would result. The two subnetworks would be designed using different permutations of the group indices {0 . . . 19}.

The embodiments described above are given by way of example, and other suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A design tool for network interconnection, comprising:
   a user interface comprising an input device and an output device; and
   a processor, which is coupled to the input device and to the output device and is configured to:
   receive via the input device design parameters comprising: (i) a number G of groups of network elements, (ii) a number S of spines associated with each group, and (iii) a number P of ports that each spine has for connecting to other spines, using short-cable connections or long-cable connections;
   select a number of subsets responsive to G and P;
   divide the groups between the subsets;
   determine for each subset to form a clique scheme connecting one of the spines of each group of the subset;
   determine to form a bipartite scheme for each pair of subsets, wherein each bipartite scheme of a pair of first and second subsets connects one of the spines of each group of the first subset to one spine of each group of the second subset;
   determine an interconnection plan by specifying connections among spines in accordance with the determined clique schemes and bipartite schemes; and
   output to the output device instructions for applying the interconnection plan.

2. The design tool according to claim 1, wherein the processor is configured to determine short-cable connections for the connections forming the clique schemes and the bipartite schemes.

3. The design tool according to claim 1, wherein the processor is configured to select the number of subsets when P divides G, as Ns=G/P and when (P+1) divides G, as Ns=G/(P+1).

4. The design tool according to claim 3, wherein the processor is configured to define one or more virtual groups, if one or more conditions on the relation between G and P are not met, so that the number of groups G including the one or more virtual groups satisfies at least one of the one or more conditions, and to specify the connections by omitting connections to the virtual spines.

5. The design tool according to claim 1, wherein the processor is configured to determine the interconnection plan by specifying a plurality of subnetworks, wherein each of the subnetworks includes clique schemes for each of the subsets and bipartite schemes for each pair of subsets.

6. The design tool according to claim 1, wherein the processor is configured to determine the interconnection plan by constraining a number of inter-group connections between any pair of the groups between Floor[Nc] and Ceiling[Nc], wherein Nc=P·S/(G−1).

7. The design tool according to claim 1, wherein the processor is configured to determine the interconnection plan by allocating spines to multiple racks, wherein the spines of each clique scheme reside in a same rack, and the spines of each bipartite scheme reside in a same rack.

8. The design tool according to claim 6, wherein the processor is configured to identify unconnected ports in spines of the clique schemes or of the bipartite schemes, and to determine short-cable connections among unconnected ports of spines in a same rack, and long-cable connections among unconnected ports of spines belonging to different racks.

9. A method for designing a network interconnection, comprising:
   receiving design parameters comprising: (i) a number G of groups of network elements, (ii) a number S of spines associated with each group, and (iii) a number P of ports that each spine has for connecting to other spines, using short-cable connections or long-cable connections;
   selecting a number of subsets responsive to G and P;
   dividing the groups between the subsets;
   determining for each subset to form a clique scheme connecting one of the spines of each group of the subset;
   determining to form a bipartite scheme for each pair of subsets, wherein each bipartite scheme of a pair of first and second subsets connects one of the spines of each group of the first subset to one spine of each group of the second subset;
   determining an interconnection plan by specifying connections among spines in accordance with the determined clique schemes and bipartite schemes; and
   applying the interconnection plan by connecting among the spines in accordance with the connections specified in the interconnection plan.

10. The method according to claim 9, wherein determining the interconnection plan comprises determining short-cable connections for the connections forming the clique schemes and the bipartite schemes.

11. The method according to claim 9, wherein selecting the number of subsets comprises selecting the number of subsets when P divides G as $Ns=G/P$ and when (P+1) divides G, as $Ns=G/(P+1)$.

12. The method according to claim 11, wherein determining the interconnection plan comprises defining one or more virtual groups, if one or more conditions on the relation between G and P are not met, so that the number of groups G including the one or more virtual groups satisfies at least one of the one or more conditions, and wherein specifying the connections comprises omitting connections to the virtual spines.

13. The method according to claim 9, wherein determining the interconnection plan comprises specifying a plurality of subnetworks, wherein each of the subnetworks includes clique schemes for each of the subsets and bipartite schemes for each pair of subsets.

14. The method according to claim 9, wherein determining the interconnection plan comprises constraining a number of inter-group connections between any pair of the groups between Floor[Nc] and Ceiling[Nc], wherein $Nc=P\cdot S/(G-1)$.

15. The method according to claim 9, wherein determining the interconnection plan comprises allocating spines to multiple racks, wherein the spines of each clique scheme reside in a same rack, and the spines of each bipartite scheme reside in a same rack.

16. The method according to claim 14, wherein determining the interconnection plan comprises identifying unconnected ports in spines of the clique schemes or of the bipartite schemes, and determining short-cable connections among unconnected ports of spines in a same rack, and long-cable connections among unconnected ports of spines belonging to different racks.

17. A communication network, comprising:
   a number G of groups of network elements, wherein each group comprises a number S of spines, and each spine comprises a number P of ports for connecting to other spines, using short-cable connections or long-cable connections,
   wherein the groups are divided between a plurality of subsets, wherein for each subset a clique scheme connects one of the spines of each group of the subset and a bipartite scheme is formed for each pair of subsets, wherein each bipartite scheme of a pair of first and second subsets connects one of the spines of each group of the first subset to one spine of each group of the second subset,
   wherein spines having a port among the P ports that is not connected in a clique or a bipartite scheme are interconnected using short-cable connections within a common rack, and using long-cable connections between different racks,
   wherein for given values of G, S and P, (i) a number of the long-cable connections among the spines is minimized, and (ii) a number of inter-group connections between pairs of groups equals $Floor[P\cdot S/(G-1)]$ or $Ceiling[P\cdot S/(G-1)]$.

18. The design tool according to claim 1, wherein the processor is configured to select the number of subsets when P divides (G−1) as $Ns=(G-1)/P$.

19. The design tool according to claim 18, wherein in dividing the groups between the subsets, one of the groups is not assigned to any of the subsets, and the processor is configured to specify connections of each of the spines of the group not assigned to any of the subsets to respective ones of the cliques of the subsets.

20. The design tool according to claim 1, wherein the processor is configured to determine the interconnection plan by specifying a number Ceiling[S/Ns] of subnetworks, wherein each of the subnetworks, except one, includes clique schemes for each of the subsets and bipartite schemes for each pair of subsets, and one of the subnetworks corresponds to different respective permutations of the G groups.

* * * * *